Dec. 26, 1961  C. W. PORTER  3,015,067
RESISTANCE WELDER CONTROL CIRCUIT WITHOUT TIMING RELAY
CONTACTS IN TIMER CIRCUIT
Filed March 24, 1958
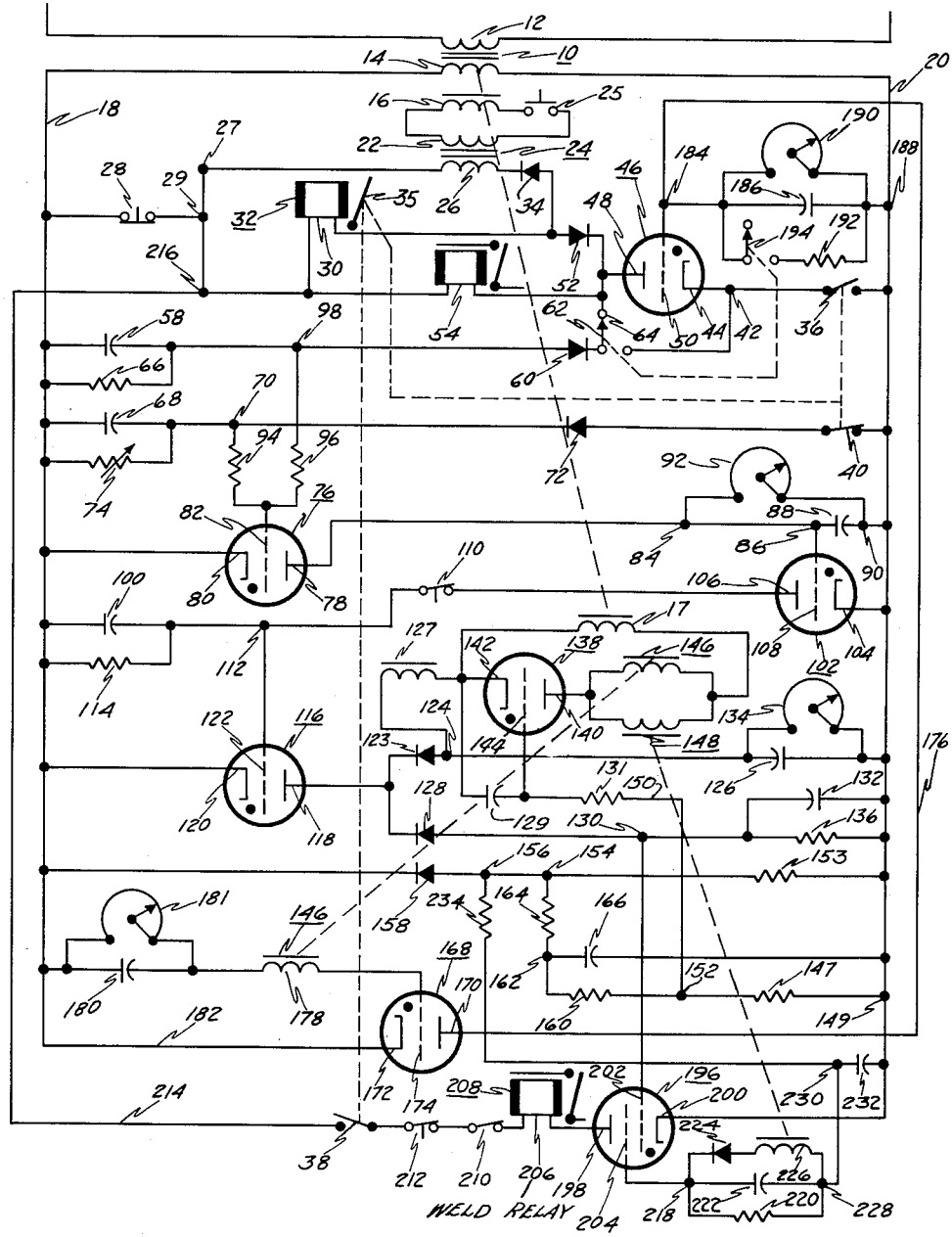
INVENTOR.
CLARENCE W. PORTER
BY
William H. Schmeling

United States Patent Office 3,015,067
Patented Dec. 26, 1961

3,015,067
RESISTANCE WELDER CONTROL CIRCUIT WITHOUT TIMING RELAY CONTACTS IN TIMER CIRCUIT
Clarence W. Porter, Wauwatosa, Wis., assignor to Square D Company, Detroit, Mich., a corporation of Michigan
Filed Mar. 24, 1958, Ser. No. 723,182
8 Claims. (Cl. 328—73)

This invention relates generally to electrical control apparatus and is more particularly concerned with an apparatus for controlling the sequence of operations of a welding machine.

The electronic weld timer according to the present invention is particularly characterized by the fact that it functions without timing relay contacts in the timer circuit. The safety relay utilized is energized with the closure of the initiating switch, which relay remains energized until the initiating switch is opened and the timer has reached the end of a particular weld sequence. During this period if the initiating switch is held closed, several repeat welds may occur. However, when the welder is set in the non repeat position, the capacitor controlling the off time period will be continuously recharged as long as the initiating switch is held closed.

It is an object of the present invention to provide a sequencing control which will operate at high speeds and includes a fail-safe arrangement; that is, termination of the end of a weld does not depend on the conduction of an electronic tube.

Another object of the present invention is to provide a non repeat circuit in a sequencing control wherein the capacitor which controls the off time is continuously recharged as long as the initiating switch is held closed.

A further object of the present invention is to control the firing of the electronic valve from two different sources, one of which delays the firing of the tube and the other of which is arranged to delay the cessation of the firing before preventing the tube from firing until the proper instant in the cycle as determined by the control which caused the initial delay.

A further object of the present invention is to utilize both the grid and shield grid of the weld firing tube to control the conduction of the tube wherein the control to the grid delays the firing of the tube and the control to the shield grid delays the cut off of the tube.

A still further object of the present invention is to arrange the tubes which control the weld tube firing so a failure of the tubes will not result in weld current flow.

A further object of the present invention is to arrange the circuits which control the flow of weld current and the actuating solenoid for the electrodes in a welder so both the flow of weld current and the current to the solenoid will be instantly interrupted without damaging the components of the weld controller and to return the components to a standby condition when an emergency stop switch is actuated.

Further objects and features of the invention will be readily apparent to those skilled in the art from the specification and appended drawing wherein the single figure diagrammatically shows a wiring diagram of a preferred embodiment of a controller according to the present invention.

In the drawing, the single FIGURE schematically shows the control circuit according to the present invention wherein the numeral 10 is used to indicate a source such as a transformer having primary winding 12 connected through suitable leads to an alternating current source, not shown, and secondary windings 14, 16 and 17. The winding 14 is arranged to supply leads 18 and 20 while the winding 16 supplies the primary winding 22 of transformer 24 when the normally open initiating means or switch 25 is closed. The switch 25 is the initiating switch of the system which when closed will complete a circuit to energize the transformer 24 which includes a secondary winding 26. The secondary winding 26 is connected in a series circuit including a junction 27, a junction 216, an actuating coil 30 of a relay 32 and a rectifying diode 34. A switch 28 which acts as an emergency stop switch is connected between lead 18 and a junction 29 located in the lead between junctions 27 and 216. When the secondary winding 26 is energized, current will flow through relay coil 30 and attract armature 35 of the relay 32 thereby causing the normally open contacts of switches 36 and 38 to close and the normally closed contacts of a switch 40 to open. The normally open contacts of switch 36 are located between the lead 20 and a junction 42 which is connected to a cathode 44 of an electronic device such as a gas filled electronic tube 46. The tube 46 has an anode 48 and a control grid 50. The anode 48 is connected through a parallel circuit comprising a series circuit including a rectifying diode 52 and the actuating coil 30 of relay 32 which is in parallel with an actuating coil of a relay 54. The parallel circuit is connected through the switch 28 to lead 18. The circuit including switch 28 and parallel connected relay coils 32 and 54 is also paralleled by a series circuit including a capacitor 58, a junction 98, a rectifying diode 60 and a switch 62 which has a contact arranged to complete a circuit to the anode 48. A time rate discharge resistance 66 is connected across capacitor 58. The capacitor 58 is charged by conduction of tube 46. A capacitor 68 has one terminal connected to lead 18 and the other terminal connected through a junction 70, a rectifying diode 72 and the contacts of switch 40 to lead 20. The charging circuit for capacitor 68 is controlled by switch 40. A variable resistance 74 is connected across capacitor 68. An electronic device such as a gas filled electronic tube 76 has an anode 78, a cathode 80 and a control grid 82. The cathode 80 is connected to lead 18 while the anode 78 is connected through a junction 84, a junction 86, a capacitor 88, and a junction 90 to lead 20. A variable potentiometer resistance 92 is connected to junctions 84 and 90 across the capacitor 88 to provide a variable discharge path for the capacitor 88. The grid 82 is connected to the junction 70 by a resistance 94 and through a resistance 96, in parallel with resistance 94 with the junction 98. The capacitor 88 is charged by conduction of tube 76.

The charging of a capacitor 100 is controlled by an electronic device such as a gas filled electronic tube 102 which has a cathode 104 connected to lead 20, an anode 106 and a control grid 108. The anode 106 is connected through a series circuit including the normally closed contacts of a switch 110 and a junction 112 to one terminal of capacitor 100 which has its other terminal connected to lead 18. Connected across the capacitor 100 is a discharge resistor 114. The grid 108 is connected to junction 86 to be responsive to the charge on capacitor 88.

An electronic device such as a gas filled electronic tube 116 has an anode 118, a cathode 120 and a control grid 122. The grid 122 is connected to junction 112 to be responsive to the charge on capacitor 100. The cathode 120 is directly connected to lead 18 while the anode 118 is connected through a pair of parallel circuits to lead 20. One of the parallel circuits includes a series connected rectifying diode 123, a junction 124 and a capacitor 126 while the other parallel circuit includes a rectifying diode 128, a junction 130 and a capacitor 132. Connected across capacitor 126 is a potentiometer 134 which is arranged to provide a variable rate discharge path for capacitor 126. Connected across capacitor 132 is a resistance 136 which provides a fixed rate time discharge path for capacitor 132. The charging of both capacitors 126 and 132 is responsive to tube 116 conduction.

An electronic device such as a gas filled electronic tube 138 has an anode 140, cathode 142, and control grid 144. The anode 140 is connected through a pair of parallel connected primary windings of transformers 146 and 148 to one terminal of the secondary winding 17 of the supply transformer 10. The cathode 142 is connected to the other end of winding 17 and is tied through a cathode heater transformer winding 127 and the capacitor 126 to one terminal of a bias source including resistor 147 at junction 149. A capacitor 129 and a resistance 131 act to slightly phase shift the output of the winding 127. The grid 144 is connected through resistance 131 and a lead 150 to a junction 152 which comprises another terminal of a bias source which will now be described.

Connected between leads 20 and 18 in series is a resistance 153, a junction 154, a junction 156 and a rectifying diode 158 which are arranged so the junctions 154 and 156 are continuously negative relative to lead 20. Connected in parallel with resistance 153 are series connected resistors 147 and 160 forming a voltage divider which are connected through a junction 162 and a resistance 164 to junction 154. Connected between junction 162 and lead 20 is a capacitor 166. The capacitor 166 and resistance 164 act as a filter circuit and to assure a substantially steady state D.C. voltage to appear across the voltage divider including resistors 147 and 160 which are interconnected at junction 152. It is clearly apparent that the cathode 142 is electrically connected through the transformer winding 127 and capacitor 126 to junction 149. The grid 144 is tied through lead 150 to junction 152 which because of voltage dividing action of resistance 147 is negative relative to junction 149. When capacitor 126 is charged, the effect of the negative bias provided by resistor 147 on grid 144 and cathode 142 is overcome so tube 138 conducts. The charge on capacitor 126 decays through potentiometer 134. When capacitor 126 is sufficiently discharged, the conduction of the tube 138 eventually ceases because of the negative bias across resistor 147. Full cycle cut off of tube 138 conduction, regardless of the settings of potentiometer 134, is assured because of the synchronizing voltage between grid 144 and cathode 142 supplied by winding 127.

An electronic device, such as a gas filled electronic tube 168, is furnished with an anode 170, a cathode 172, and a control grid 174. The cathode 172 is directly connected by lead 182 to lead 18. The anode 170 is connected by a lead 176 through a circuit which will be hereinafter described, to the lead 20. The control grid 174 is connected in series with a secondary winding 178 of the transformer 146, a capacitor 180 and the lead 182 to the cathode 172. Thus, whenever winding 178 is energized and line 18 is negative in polarity, the capacitor 180 will be charged by grid conduction of tube 168 to provide a hold off bias to prevent conduction of tube 168. The anode 170 is tied by lead 176 to a junction 184 which in turn is connected to the grid 50 and through a capacitor 186 to lead 20 at junction 188. Connected across the capacitor 186 is a parallel circuit comprising the potentiometer resistance 190 which provides a variable rate discharge path for the capacitor 186 and a series circuit comprising a resistance 192 and a switch 194 having normally open contacts which when closed will provide a rapid discharge path for the capacitor 186. The operation of switch 194 will be hereinafter described.

A tube 196 has anode 198, a cathode 200, a control grid 202 and a shield grid 204. The cathode 200 is directly connected to lead 20. The anode is connected in a series circuit which comprises the actuating coil 206 of a relay 208, a normally closed switch 210, a normally closed switch 212 and the normally open contacts of switch 38, and a lead 214 which connects the anode to junction 216 to make the anode circuit of tube 196 responsive to the opening of switch 28. The grid 202 is directly connected to the junction 130 so the bias on the grid is responsive to the charge of capacitor 132. The shield grid 204 is connected to a junction 218 which in turn is connected through a three branched parallel circuit comprising a resistor 220 and a capacitor 222 in two of the branches and a rectifying diode 224 in series with a secondary winding 226 of the transformer 148 in the third branch. The three parallel branches terminate in a junction 228 which in turn is connected to a junction 230. The junction 230 is connected to lead 20 through a capacitor 232 and through a resistor 234 to junction 156. The resistor 234 and the capacitor 232 form a filter network to filter the A.C. component passing through rectifier 158 to provide the negative bias at junction 156 which is impressed on the shield grid 204.

Full cycle conduction of tube 196 is assured because of the arrangement of the components in the circuits which will now be described. During standby conditions, the charge on capacitor 132 impressed on the grid 202 will hold tube 196 from conducting and the winding 226 will be energized to charge capacitor 222 and overcome the negative bias from junction 156. Thus during standby the tube 196 will be controlled by the bias on grid 202.

The tube 102 fires when lead 18 goes positive and tube 116 fires when lead 20 goes positive. Therefore when tube 102 fires to charge capacitor 100, on the succeeding half cycle, the grid 122 of tube 116 will be negative to render tube 116 non conducting. When tube 116 ceases conducting both capacitors 126 and 132 begin to discharge at rates determined respectively by the potentiometer 134 and resistance 136. The tube 138 continues to conduct until the charge on capacitor 126 has decayed sufficiently to cause the grid 144 to be rendered negative, because of the bias impressed by junction 152, relative to the cathode 142.

The tube 196 is connected to conduct when the line 18 is positive. As previously stated, tube 116 is connected to conduct when line 20 is positive. The resistance 136 is sized so capacitor 132 will discharge in approximately two cycles after tube 116 ceases conducting. Therefore two cycles after tube 116 ceases conducting, the grid 202 will be unable to hold off the conduction of tube 196. The termination of the discharge of capacitor 136 will occur during the period when line 18 is of negative polarity. This will assure a full cycle conduction of tube 196 when line 18 goes positive on the succeeding half cycle after capacitor 132 discharges, regardless of supply voltage variations.

The resistance 220 is sized to discharge capacitor 222 in approximately 3 cycles. This capacitor 222 is charged during the period when tube 138 is conducting by the flux collapse in winding 226. Therefore three cycles after tube 138 stops conducting the capacitor 222 will be discharged and the bias at junction 156 will cause the shield grid 204 to hold the tube 196 from conducting. This hold off bias will be initially effective when line 18 is positive. Therefore the tube 196 will be cut off after a full cycle of conduction.

The operation of the weld timer according to the above description will now be described. During standby conditions, that is, prior to the closure of the initiating switch 25, transformer 10 will be energized. During this time the tubes 76, 116 and 138 will be conducting, causing capacitors 88, 126, 132, 222, and 180 to be charged. The contacts of switch 40 are also closed so capacitor 68 is also charged.

When the operator closes the initiating switch 25, the transformer 24 will be energized, causing the actuating coil 30 of relay 32 to be energized to attract armature 35. This armature is mechanically connected, as represented by the dotted lines, to switches 36, 40, and 38. When the relay 32 is energized, the contacts of switch 36 will be closed, thereby allowing the tube 46, which is known as the "initiation tube," to conduct. When tube 46 conducts, a holding circuit for the actuating coil 30 is completed from lead 18 through switch 28, junction 29, junction 216, the actuating coil 30 of the relay 32, rectifier 52 through tube 46 through the now closed contacts of switch 36 to lead 20. From the above it is apparent that an opening of the switch 25 at this time will not affect the operation of relay 32. The conduction of tube 46 also will cause the energization of the relay 54 through a circuit which includes switch 28, junction 29, junction 216, tube 46 and the switch 36. The relay 54, known as the "valve relay," is arranged in the welding apparatus to actuate a solenoid valve circuit, not shown, which causes movement of the welding electrodes of the apparatus to the welding position. In this connection it is to be noted that the relay may also consist of a pulsing transformer. In the drawing, the relay 54 has an armature which is attracted to close a circuit only partly shown for accomplishing the movement of the electrodes.

When the relay 32 is actuated, the contacts of switch 40 are opened to interrupt the charging circuit to capacitor 68 to permit the capacitor 68 to discharge at a rate determined by the setting of resistance 74. During this period, tube 76, known as the "squeeze delay tube," continues to conduct for a squeeze delay time until capacitor 68 has discharged sufficiently to allow the negative charge on capacitor 58 to override the grid signal from capacitor 68 and thereby render tube 76 nonconducting. The capacitor 58 is charged by the conduction of tube 46 through a circuit which includes switch 62 and rectifier 60.

The capacitor 88, which has been previously charged by the conduction of tube 76, begins to discharge when the squeeze delay tube 76 is rendered nonconducting. The rate of discharge of capacitor 88 is determined by the potentiometer 92, which may be termed the "squeeze time capacitor." After a sufficient time period has elapsed, the charge on capacitor 88 is no longer sufficient to maintain tube 102 nonconducting and this tube 102, known as a "squeeze tube," conducts, providing the switch 110 is closed. The switch 110 is preferably a well known pressure switch which is responsive to the pressure which causes the closure of the welding electrodes. When tube 102 conducts the capacitor 100 is charged to instantly cause tube 116 to be rendered nonconducting. As previously explained, the voltage of the grid to cathode of tube 138, known as the "weld off" tube, is dependent on the charge on capacitor 126, which charge now begins to dissipate through the potentiometer 134 which is known as the "weld time adjuster." As previously indicated, a bias voltage is impressed between the grid 144 and cathode 142 by the bias across resistor 147. After the charge on capacitor 126 has decayed sufficiently, the conduction of tube 138 ceases so that the pulsing of transformers 146 and 148 also ceases. When the tube 116 ceases conducting, the charge on the capacitor 132, which is impressed on the grid of tube 196 to hold the tube 196 from conducting, begins to dissipate through resistance 136. The resistance 136 and capacitor 132 are preferably selected so that the dissipation of the capacitor will occur after a two cycle interval. Therefore, after two cycles have elapsed, tube 196 becomes conductive providing its anode circuit is complete. In this connection it is to be noted that the contacts of switch 38 are closed when relay 32 is energized. The switch 212 is a safety switch, which in a conventional manner is closed whenever the ignitrons controlling the current flow to the welding transformer are functioning properly. The switch 210 is a conventional switch used in welding circuits and is known as the "weld-no-weld switch." The switch 28 which is also included in the anode circuit of tube 196, is known as the "emergency stop switch." As previously indicated, the conduction of tube 138 will cause the transformers 146 and 148 to become energized. The transformer 148 has a secondary winding 226 arranged to charge capacitor 222 with a charge which will render the shield grid 204 positive and overcome the negative bias present at junction 228. After weld timing, the capacitor 222 has a sufficient charge to cause continued conduction of tube 196 for approximately three cycles after tube 138 ceases conducting. This delay is caused by the time necessary for capacitor 222 to discharge through resistor 220. After capacitor 222 is sufficiently discharged, the negative bias at junction 228 will cause the shield grid 204 to be biased negative to provide a hold-off circuit for the tube. When tube 196 is conducting, the relay 206 is energized. This relay 206 which is known as the "weld relay," will complete a circuit to the ignitrons in the conventional manner. In this connection, if desired, the relay 206 may be replaced by a suitable well known transformer winding and may be used in the circuit described in application Serial No. 723,183, concurrently filed herewith and assigned to the assignee of the present invention.

When tube 138 ceases conducting, the pulsing of transformer 148 ceases and the secondary winding 178 ceases to supply a charging current to capacitor 180. This capacitor 180, known as the "hold time capacitor," begins to discharge through the potentiometer 181, permitting tube 168 to conduct and thereby charge the capacitor 186 through lead 176. When capacitor 186 is thus charged, a holdoff voltage is impressed on grid 50, causing tube 46 to cease conduction. From the above it is apparent that the charging of capacitor 186 may occur two cycles before tube 196 ceases conducting. This is known as a "negative hold time" and in the circuit according to the present invention, may be accomplished at minimum hold time adjuster settings as determined by the setting of potentiometer 181.

When tube 46 ceases conduction, the relay 54 is deenergized and separation of the welding electrodes occurs. The capacitor 186 discharges through an off-time adjuster potentiometer shown as potentiometer 190, to accomplish the off timing. The remainder of the circuits are reactivated because capacitor 58 discharges through resistance 66, permitting tube 76 conduction. During this period capacitor 88 charges and tube 102 ceases conduction, thereby causing tubes 116 and 138 to conduct and charge capacitors 126, 132 and capacitors 180 and 222.

During repeat operation, that is, when the switch 25 is held closed to accomplish a plurality of weld cycles, the switch 62 is in the position indicated, thereby causing the contacts of the switch 40 to remain open because relay 32 is continuously energized. This prevents the squeeze delay capacitor 68 from being recharged.

After the off time period determined by the discharge of capacitor 186, tube 46 conducts and capacitor 58 immediately charges, cutting off tube 76 conduction thus allowing capacitor 88 to discharge. Thus squeeze delay is effective only during the first sequence of a repeat operation. The remainder of the sequence continues as before described.

When the initiating circuit is opened during a sequence, the relay 32 ceases to be energized when conduction of tube 46 ceases, which occurs at the beginning of off timing. When this occurs, all circuits return to standby condition.

When the switch 62 is moved to its alternate position for non-repeat operation, switch 194 will also be moved to its alternate position. When the switches are in this position the relay 32 will be energized, maintaining switch contacts 36 closed and switch contacts 40 open. This means that capacitor 58 will be charged holding off tube 76. The negative charge on grid 50 from capacitor 186 will cause the conduction of tube 46 to cease, thereby deenergizing the relay 54 which causes the welding electrodes to separate. The continuance of the hold off charge on capacitor 58 however, because of the position of switch 64 in the non repeat position, is not dependent on the conduction of tube 46. This means capacitor 58 will continue to be recharged as long as switch 25 is held closed. When switch 25 is opened, the relay 32 will be deenergized and switches 36 and 40 will be opened and closed respectively to return the circuit to the standby condition. In this connection it is to be noted that during the period when switch 25 is held closed and the weld cycle has been completed, the hold off tube will continue to conduct, thereby continuously charging capacitor 186 which causes the tube 46 to hold off from conduction.

The anode circuit for tube 196 includes weld-no-weld switch 210, ignitron temperature protective interlock 212, switch 38 and the weld firing means which may be a relay 206 or a pulsing transformer. In addition, the emergency stop provision provided by switch 28 is included in the tubes 196 and 46 anode circuits so that the solenoid valve including relay 54 and weld circuits including relay 208 will be instantly interrupted should emergency stop become necessary. The emergency stop switch 28 should be held open and the initiating switch 25 also opened long enough to insure the return of all circuits to standby conditions.

To facilitate explanation, the tube heater circuits, grid current limiting resistors and filter capacitors, etc., have not been shown in the drawing or set forth in this specification. The inclusion thereof will be readily apparent to those skilled in the art. Further, the rectifying diodes shown are arranged in the circuit to conduct in the conventional manner to achieve the results set forth in the foregoing specification.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a control system, the combination comprising; a first electronic device having a pair of main electrodes connected in an output circuit and a pair of control electrodes arranged to control the conduction of the device, a bias means connected to one of the control electrodes of the device and arranged to render the device non conductive, a second electronic device, a first and second timing network arranged to be energized by the conduction of the second device, a rectifier in each of said first and second timing networks for preventing the networks from energizing each other when the second device is non conductive, a third electronic device having a control electrode and a main electrode, a constant bias on the control electrode of the third device, a connection between the main electrode and the first timing network arranged for rendering said device conductive when the first timing network is de-energized, a connection between the second timing network and the other control electrode of the first electronic device arranged to render the device non conductive when the second timing network is energized and for a predetermined time after the second electronic device is rendered non conductive, a third timing network coupled to be energized by the conduction of the third device and arranged to overcome the bias of the bias means on the one electrode and arranged for maintaining said first device conductive a predetermined time after said third device is rendered non conductive by the first timing network.

2. In a control circuit, the combination comprising; an electronic device arranged to control an off time period, an electronic device arranged to control a squeeze delay period, an electronic device arranged to control a weld period, a timing network connected to the squeeze delay device, each of said devices having a pair of principal electrodes and a control electrode, an initiating switch, a relay closed continuously whenever the initiating switch is closed so as to be closed during each of said periods including the off time period, a plurality of contacts arranged to be actuated by the energization of the relay, said contacts consisting of a pair of normally open contacts in circuit with the principal electrodes of the off time device, a pair of normally closed contacts in circuit with the timing network and a pair of normally open contacts in circuit with the principal electrodes of the weld period device.

3. In a control circuit, the combination comprising; an electronic device arranged to control an off time period, an electronic device arranged to control a squeeze delay period, an electronic device arranged to control a weld period, each of said devices having a pair of principal electrodes and a control electrode, a timing network connected to the squeeze delay device, an initiating switch, a relay closed continuously whenever the initiating switch is closed so as to be closed during each of said periods including the off time period, and a plurality of contacts arranged to be actuated by the energization of the relay, said contacts consisting of a pair of contacts in circuit with principal electrodes of the off time device, a pair of contacts in circuit with the timing network and a pair of contacts in circuit with the principal electrodes of the weld period device.

4. In a control circuit, the combination comprising; a supply source, a relay arranged to be energized from the source whenever an initiating switch is closed for opening a first pair of normally closed contacts and closing a second and third pair of normally open contacts, a first electronic tube conductive when the second pair of contacts are closed, a first timing network energized through the normally closed first pair of contacts and de-energized at a predetermined rate when the first pair of contacts open, a second timing network arranged to be energized by the conduction of the first tube, a second electronic tube connected to the first and second timing networks and rendered non conductive after a predetermined period by the second timing network, a third timing network energized when the second tube is conducting and arranged to initiate a timing period when the second tube is rendered non conductive, a third electronic tube normally biased from conducting by the third network and arranged to be rendered conducting at the end of the period, a fourth timing network arranged to be energized by the conduction of the third tube, a normally conducting fourth tube arranged to be rendered non conducting when the fourth time network is energized, a fifth and sixth timing networks arranged to be energized in response to the conduction of the fourth tube, a fifth tube having its conductivity controlled by the fifth network, a sixth tube having a pair of control electrodes and a pair of main electrodes connected in an output circuit, a bias means connected to one of the control electrodes for rendering the seventh tube non conducting, a sixth timing network coupled to be energized in response to the conduction of the fifth tube and arranged to oppose the bias means for rendering the sixth tube conductive for a predetermined period, means connecting the sixth time network to the other control electrode of the sixth tube for delaying the conductivity of the sixth tube a predetermined period after the fourth tube is rendered non conductive, a seventh tube, an eighth time constant network coupled with the fifth tube and arranged to be energized through said seventh tube in response to the conduction of the fifth tube, said seventh tube and eighth timing network being arranged so the seventh tube is rendered conductive a predetermined time after the fifth tube is rendered non conductive, and a ninth timing network arranged to be energized in response to the conduction of the seventh tube and arranged for rendering the first tube non conductive for a predetermined time for de-energizing the second timing network before the above cycle is repeated.

5. In a control circuit, the combination comprising; a supply source, a relay arranged to be energized from the source whenever an initiating switch is closed for opening a first pair of normally closed contacts and closing a second and third pair of normally open contacts, a first electronic tube conductive when the second pair of contacts are closed, a first timing network energized through the normally closed first pair of contacts and de-energized at a predetermined rate when the first pair of contacts open, a second timing network arranged to be energized by the conduction of the first tube, a second electronic tube connected to the first and second timing networks and rendered non conductive after a predetermined period by the second timing network, a third timing network energized when the second tube is conducting and arranged to initiate a timing period when the second tube is rendered non conductive, a third electronic tube normally biased from conducting by the third network and arranged to be rendered conducting at the end of the period, a fourth timing network arranged to be energized by the conduction of the third tube, a normally conducting fourth tube arranged to be rendered non conducting when the fourth time network is energized, a fifth and sixth timing networks arranged to be individually energized in response to the conduction of the fourth tube, means for preventing the fifth and sixth timing networks from energizing each other, a fifth tube having its conductivity controlled by the fifth network, a sixth tube having a pair of control electrodes and a pair of main electrodes connected in an output circuit, a bias means connected to one of the control electrodes for rendering the sixth tube non conducting, a seventh timing network coupled to be energized in response to the conduction of the fifth tube and arranged to oppose the bias means for rendering the sixth tube conductive for a predetermined period, means connecting the sixth time network to the other control electrode of the sixth tube for delaying the conductivity of the sixth tube a predetermined period after the fourth tube is rendered non conductive, a seventh tube, an eighth time constant network coupled with the fifth tube and arranged to be energized through said seventh tube in response to the conduction of the fifth tube, said eighth tube and seventh timing network being arranged so the seventh tube is rendered conductive a predetermined time after the fifth tube is rendered non conductive, and a ninth timing network arranged to be energized in response to the conduction of the seventh tube and arranged for rendering the first tube non conductive for a predetermined time for de-energizing the second timing network before the above cycle is repeated.

6. The combination as set forth in claim 4 wherein a repeat-non repeat switch is arranged to shorten the timing period of the ninth timing network.

7. The combination as set forth in claim 4 wherein the switch is arranged to provide a circuit for continuously charging the second timing network after the second pair of contacts are closed.

8. In a control circuit, the combination comprising; a supply source, a relay arranged to be energized from the source in response to the closure of an initiating switch for opening a first pair of normally closed contacts and closing a second and third pair of normally open contacts, a first electronic tube conductive when the second pair of contacts are closed, a first timing network energized through the normally closed first pair of contacts and de-energized at a predetermined rate when the first pair of contacts open, a second timing network arranged to be energized by the conduction of the first tube, a second electronic tube connected to the first and second timing networks and rendered non-conductive after a predetermined period by the second timing network, a third timing network energized when the second tube is conducting and arranged to initiate a timing period when the second tube is rendered non-conductive, a third electronic tube biased from conducting by the third network and arranged to be rendered conducting at the end of the period, a fourth timing network arranged to be energized by the conduction of the third tube, a normally conducting fourth tube arranged to be rendered non-conducting when the fourth time network is energized, a fifth and sixth timing networks arranged to be individually energized in response to the conduction of the fourth tube, a fifth electronic tube, a bias means arranged to normally render the fifth tube non-conducting and to be overcome by the fifth timing network for rendering the fifth tube conducting when the fifth timing network is energized, a sixth tube having a pair of control electrodes and a pair of main electrodes connected in an output circuit, a bias means connected to one of the control electrodes for rendering the sixth tube non-conducting, a seventh timing network coupled to be energized in response to the conduction of the fifth tube and arranged to oppose the bias means for rendering the sixth tube conductive for a predetermined period, means connecting the sixth time network to the other control electrode of the sixth tube for delaying the conductivity of the sixth tube a predetermined period after the fifth tube is rendered non-conductive, a seventh tube, an eighth time constant network coupled with the fifth tube and arranged to be energized by grid conduction through said seventh tube in response to the conduction of the fifth tube, said seventh tube and eighth timing network being arranged so the seventh tube is rendered conductive a predetermined time after the fifth tube is rendered non-conductive, and a ninth timing network arranged to be energized in response to the conduction of the seventh tube and arranged for rendering the first tube non-conductive for a predetermined time for de-energizing the second timing network before the above cycle is repeated.

References Cited in the file of this patent

UNITED STATES PATENTS

| | | |
|---|---|---|
| 2,508,467 | Parsons et al. | May 23, 1950 |
| 2,623,146 | Anger | Dec. 23, 1952 |
| 2,710,326 | Collom | June 7, 1955 |
| 2,734,133 | Riley | Feb. 7, 1956 |
| 2,765,402 | Bivens | Oct. 2, 1956 |

UNITED STATES PATENT OFFICE
CERTIFICATE OF CORRECTION

Patent No. 3,015,067　　　　　　　　　　　　December 26, 1961

Clarence W. Porter

It is hereby certified that error appears in the above numbered patent requiring correction and that the said Letters Patent should read as corrected below.

Column 8, line 3, for "closed" read -- energized --; line 4, for "closed", second occurrence, read -- energized --; line 58, for "seventh" read -- sixth --; line 59, for "sixth" read -- seventh --; column 9, line 45, for "eight tube and seventh" read -- seventh tube and eight --.

Signed and sealed this 24th day of July 1962.

(SEAL)
Attest:

ERNEST W. SWIDER
Attesting Officer

DAVID L. LADD
Commissioner of Patents